March 10, 1964  A. BELZER  3,124,287
AUTOMOBILE POCKET
Filed May 12, 1961

INVENTOR.
ALFRED BELZER
BY Richards & Geier
ATTORNEYS

United States Patent Office 3,124,287
Patented Mar. 10, 1964

3,124,287
AUTOMOBILE POCKET
Alfred Belzer, 209—45 18th Ave., Bayside, N.Y.
Filed May 12, 1961, Ser. No. 109,780
1 Claim. (Cl. 224—29)

This invention relates to automobile upholstery and refers more particularly to automobile upholstery pockets in which umbrellas, canes and the like may be stored.

It is well known that umbrellas are cumbersome to carry, even when they are folded. This is particularly true when the umbrella or cane is being carried in a confined space such as in an automobile. Under such circumstances, persons are prone to set the umbrella down in any available, but sometimes haphazard location, much to the discomfort of themselves and others. Thus when a person, before alighting from the automobile, seeks to retrieve the umbrella (which quite often has slipped to the floor), additional bother and inconvenience to others may and frequently does occur. Furthermore, umbrellas and canes can be easily broken within the confined space of a car.

It is an object of the present invention to provide an upholstery pocket in an automobile which supports an ordinary, folded umbrella when not in use.

Another object is to provide an umbrella storage pocket in an automobile which makes use of space not otherwise reserved for human occupancy and which makes it possible to conveniently withdraw the umbrella.

Yet another object is to contribute to automobile safety by providing storage for objects, such as an umbrella, which if they were carried loosely, could become injury dealing objects in an accident or emergency situation.

These and other objects of the present invention will become apparent in the course of the following specification.

In the attainment of the aforesaid objectives, the umbrella pocket is made by affixing a strip of fabric having the general outline of an ordinary folded umbrella, to a vertical section of the automobile upholstery. The top, bottom and narrow end edges of the strip are secured along their full lengths to the automobile upholstery, with the wide end or handle edge being left unsecured so that an open pocket is formed in the upholstery into which an ordinary umbrella can be inserted. In affixing the strip of fabric, the narrow end is given a lower vertical position with respect to the wide end so that an umbrella inserted in the pocket, will by force of its own weight tend to bury itself deeper in the pocket, thus reducing the chance that it can accidentally fall out. As stated above, the pocket can be made on various locations in the automobile upholstery. According to a preferred embodiment of the inventive idea the umbrella pocket is located on the vertical front wall of a seat just above floor level, so that the umbrella or cane, can be easily withdrawn or inserted when the door of the automobile is open. According to another embodiment, which may be combined with the first embodiment, the umbrella pocket is so located that it can be conveniently withdrawn through an open window of the automobile.

The invention will appear more clearly from the following detailed description when taken in conjunction with the accompanying drawing, showing by way of illustration a preferred embodiment of the inventive concept.

In the drawing.

Referring now more particularly to the drawing, like reference numerals in the various figures will be taken to designate like parts.

Figure 1:
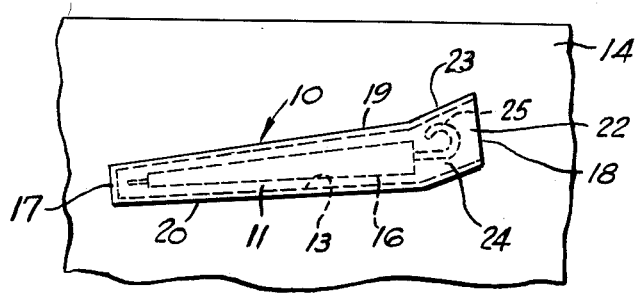
FIGURE 1 is a front elevational view of an umbrella pocket made in the upholstery of an automobile, the upholstery being shown in partial view.
Figure 2:
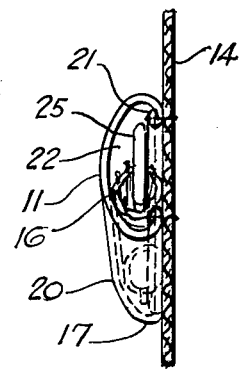
FIGURE 2 is an end elevational view of FIGURE 1.

The umbrella pocket 10 comprises an elongated strip of fabric 11 which is secured, preferably by stitching 13, to a vertical section 14 of upholstery in an automobile 15. The strip 11 has a shape generally conforming to that of collapsible telescoping umbrella 16 in a folded position. That is to say, the strip is narrow at one end 17 and tapers outwardly in the direction of the other end 18. The strip 11 is secured to the upholstery 14 along its longitudinal edges 19 and 20 and the narrow end edge 17, the edges being folded over to double thickness 21 to provide sufficient backing so that the stitching will not pull out of the fabric. The wide end 18 of the strip is left unsecured and thus provides an opening 22 through which an umbrella 16 can pass when being inserted in the pocket.

As shown in FIGURE 1, the strip is shaped with a bend and bulge 23 at its wide end so as to form with the upholstery, a pocket bulge 24 adjacent the open end, to accommodate the umbrella handle 25. The strip is secured to the upholstery with the narrow end 17 at a lower vertical position than the opposite end 18, which makes the pocket extend downward at an incline so that the umbrella carried in the pocket tends by force of its own weight to bury itself deep in the pocket. This insures that the umbrella will be held securely in the pocket and not accidentally fall out due to normal vehicular motion of the automobile 15.

Figure 3:
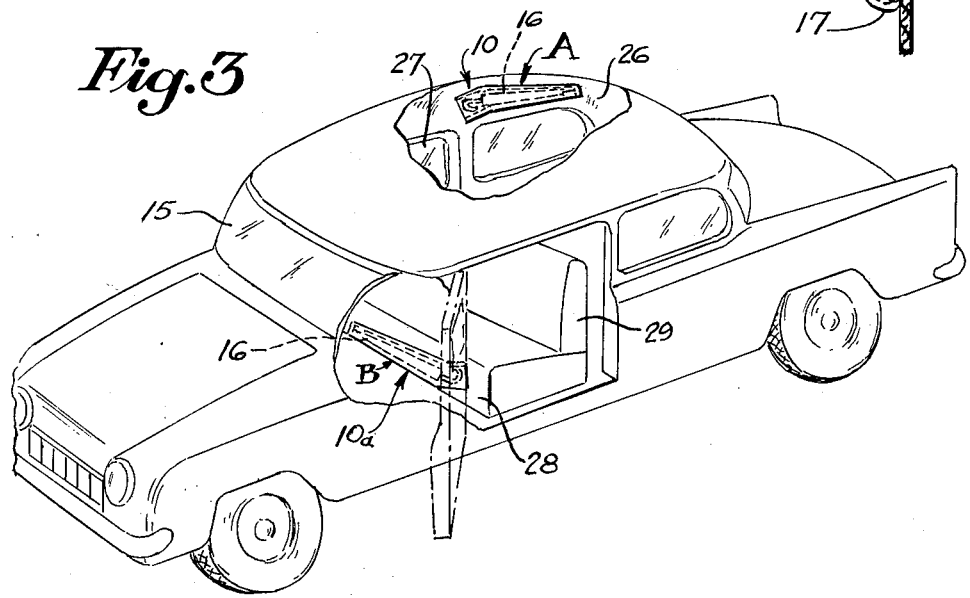
FIGURE 3 is a partial view in perspective of an automobile interior showing two umbrella pockets.

As illustrated in FIGURE 3, pockets are located in two locations on the automobile upholstery 14.

In one location A, the pocket 10 is made on the vertical side extension 26 of the roof paneling above the rear window. In this location an umbrella or cane can be conveniently inserted or removed by a user through an open window 27. It is obvious that such a person can store the umbrella in the pocket 10 prior to entering or remove it on leaving the automobile without suffering any inconvenience to themselves or others.

A second location B, one of particular advantage for use by the driver of the automobile, is also illustrated in FIGURE 3. In this case, the pocket 10a is made in the vertical front wall 28 of the driver's seat 29 just above the automobile floor. The pocket 10a is located in front of the automobile door, so that the user can easily pull out the umbrella as soon as the door is opened.

In both locations, the pocket occupies space that is normally not used and thus an umbrella can be readily stored without detracting from the comfort of persons seated in the automobile. Furthermore, the pockets are so located that the umbrellas can be quickly and readily removed as soon as a person is outside the automobile interior.

It will thus be observed that a novel, unobtrusive upholstery pocket for storing an umbrella in an automobile has been provided. Obviously, the same or similar pockets could be used for storing canes, crutches of disabled persons and other elongated objects.

The above disclosure has been given by way of illustration and elucidation and not by way of limitation, and it is desired to protect all embodiments of the herein disclosed inventive concept within the scope of the appended claim.

What is claimed is:

In an automobile having a body including a front seat section and a rear seat section, said rear seat section having a side window; said body having inner upholstery; an upholstery pocket located above said side window and comprising an elongated strip of fabric having diverging longitudinal margins and ends directed transversely of said margins, and means connecting said strip along its longitudinal margins and one end to said upholstery for forming therewith a pocket having an opening located at the other end of said strip and facing said front seat section; the width of said strip being increasingly wider from the first-mentioned end in the direction of the other end, a portion of said strip adjacent said opening being inclined downwardly with respect to the rest of said strip.

References Cited in the file of this patent

UNITED STATES PATENTS

| | | |
|---|---|---|
| 173,625 | Havens | Feb. 15, 1876 |
| 1,585,551 | Katz | May 18, 1926 |
| 1,610,026 | Miller | Dec. 7, 1926 |
| 1,823,648 | Dunn | Sept. 15, 1931 |
| 2,426,113 | Northcutt | Aug. 19, 1947 |
| 2,461,390 | Montague | Feb. 8, 1949 |

FOREIGN PATENTS

| | | |
|---|---|---|
| 201,157 | Switzerland | Nov. 15, 1938 |